(12) United States Patent
Schmidtlein et al.

(10) Patent No.: US 9,590,544 B2
(45) Date of Patent: Mar. 7, 2017

(54) METHOD FOR OPERATING AN ELECTRIC MOTOR AND CORRESPONDING ELECTRIC MOTOR DEVICE

(71) Applicant: Robert Bosch GmbH, Stuttgart (DE)

(72) Inventors: Andreas Schmidtlein, Tamm (DE); Gotthilf Koerner, Weissach (DE); Marco Ferwagner, Ubstadt-Weiher (DE); Christoph Emde, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/647,753

(22) PCT Filed: Sep. 27, 2013

(86) PCT No.: PCT/EP2013/070212
§ 371 (c)(1),
(2) Date: May 27, 2015

(87) PCT Pub. No.: WO2014/082772
PCT Pub. Date: Jun. 5, 2014

(65) Prior Publication Data
US 2015/0303849 A1 Oct. 22, 2015

(30) Foreign Application Priority Data
Nov. 27, 2012 (DE) .......................... 10 2012 221 662

(51) Int. Cl.
*H02P 6/14* (2016.01)
*H02P 7/29* (2016.01)

(52) U.S. Cl.
CPC ................ *H02P 7/29* (2013.01); *H02P 7/291* (2016.02)

(58) Field of Classification Search
CPC .... H02P 3/00; H02P 6/00; H02P 27/04; H02P 27/06; H02P 25/00; H02P 27/00
(Continued)

(56) References Cited

U.S. PATENT DOCUMENTS 4,581,565 A * 4/1986 Van Pelt ........................ 318/294
8,604,729 B2 * 12/2013 Clothier .................... A47L 5/24
318/400.01
(Continued)

FOREIGN PATENT DOCUMENTS

DE  10 2007 019408  11/2008
DE  10 2007 060949   6/2009

*Primary Examiner* — Antony M Paul
(74) *Attorney, Agent, or Firm* — Gerard Messina

(57) ABSTRACT

A method for operating an electric motor connectable via a switching device to a current source and connected in parallel with a freewheeling device, the switching device having control applied to it at a specific activation ratio within each working cycle to establish a desired effective operating voltage of the electric motor, so that in at least one operating mode each working cycle is includes an activation and a freewheeling time period. The freewheeling device has a freewheeling transistor and a freewheeling diode, connected in parallel with the transistor and reverse-biased as to the current source; and control is applied to the freewheeling transistor in the freewheeling time period as follows: identifying the freewheeling voltage dropping across the electric motor; and switching the freewheeling transistor for a specific switching time period if the freewheeling voltage is different from zero, particularly less than zero. Also described is an electric motor device.

21 Claims, 2 Drawing Sheets

(58) Field of Classification Search
USPC ......... 318/400.01, 400.14, 400.15, 700, 721,
318/727, 779, 799, 432, 599, 811, 800,
318/801, 400.26, 400.27; 363/40, 95,
363/120, 175
See application file for complete search history.

(56) References Cited

U.S. PATENT DOCUMENTS

| | | | | |
|---|---|---|---|---|
| 2002/0030462 A1* | 3/2002 | Matsushiro | ............. | H02P 6/085 318/727 |
| 2010/0251511 A1* | 10/2010 | Clothier | .................... | A47L 5/24 15/412 |

* cited by examiner

METHOD FOR OPERATING AN ELECTRIC MOTOR AND CORRESPONDING ELECTRIC MOTOR DEVICE

FIELD OF THE INVENTION

The present invention relates to a method for operating an electric motor that is connectable via a switching device to a current source and is connected in parallel with a freewheeling device, the switching device having control applied to it at a specific activation ratio within each working cycle in order to establish a desired effective operating voltage of the electric motor, so that in at least one operating mode each working cycle is made up of an activation time period and a freewheeling time period. The present invention furthermore relates to an electric motor device.

BACKGROUND INFORMATION

The electric motor is present, for example, as a direct-current electric motor that can be connected via the switching device to the current source, embodied as a direct-current source, by corresponding adjustment of the switching device. The current source or direct-current source may have a constant voltage. If the electric motor is then continuously connected to the current source, a specific rotation speed of the electric motor, dependent on the voltage of the current source, is consequently established.

In order to adjust the rotation speed, therefore in particular to control it in open- and/or closed-loop fashion, provision is made to adjust, with the aid of the switching device, the effective operating voltage that is present at the electric motor. A pulse width modulation is performed, for example, for this purpose, in which for multiple successive working cycles, within each individual one of the working cycles a specific activation ratio is identified and is established at the switching device. The electric motor therefore periodically may be connectable to the current source by way of the switching device.

The activation ratio identifies the ratio between the duration of an activation time period—the only one in which the switching device is rendered conductive—and the total duration of the corresponding working cycle. If the effective operating voltage is to correspond to the voltage furnished by the current source, the switching device must then be rendered conductive for the entire working cycle, so that the duration of the activation time period corresponds to the duration of the respective working cycle.

In the at least one operating mode, however, the effective operating voltage is intended to be lower than the voltage furnished by the current course. The switching device is accordingly not rendered conductive over the entire working cycle, so that the working cycle is made up of the activation time period and the freewheeling time period; during the latter, the switching device is not switched, i.e. the electrical connection between the current source and the electric motor is interrupted. The desired effective operating voltage, and consequently the desired rotation speed of the electric motor, can be adjusted in this fashion, in particular adjusted in open- and/or closed-loop fashion.

Because the electric motor or its motor windings have a high inductance, a current dissipation path is necessary after each activation time period. This path is furnished via the freewheeling device, which is connected in parallel with the electric motor. The freewheeling device can be, for example, a diode, which in accordance with its function can also be referred to as a "freewheeling diode" and is reverse-biased with respect to the electric motor. This means that during the activation time period no electrical current flows through the freewheeling device, so that the current is completely available to operate the electric motor. In the freewheeling time period, conversely, the motor current flowing through the electric motor can be dissipated via the freewheeling device.

The embodiment of the freewheeling device as a freewheeling diode has the advantage that no active control application at all, for example by way of a control unit, is necessary: the diode blocks automatically as soon as the motor current is dissipated. The freewheeling diode thus represents a passive freewheeling device. The disadvantage of this circuit, however, is a relatively high power loss, which is determined by the diode's forward voltage and the motor current. This is particularly disadvantageous with electric motors that are operated with high current and a low operating voltage, which is often the case in the automotive sector.

SUMMARY OF THE INVENTION

The method, having the features described herein, for operating an electric motor has, in contrast, the advantage that the power loss is appreciably reduced with little circuit-engineering outlay. This is achieved according to the present invention by the fact the freewheeling device has a freewheeling transistor and a freewheeling diode, connected in parallel with the transistor and reverse-biased with respect to the current source; and that control is applied to the freewheeling transistor in the freewheeling time period with the following steps: identifying the freewheeling voltage dropping across the electric motor; and switching the freewheeling transistor for a specific switching time period if the freewheeling voltage is different from zero, in particular is less than zero. In contrast to methods known from the existing art, it is now not (or at least not exclusively) the passive freewheeling device in the form of the (freewheeling) diode that is used, but instead an active, i.e. switchable, freewheeling device. The latter encompasses the freewheeling transistor and the freewheeling diode, which are connected in parallel with one another. In terms of circuit engineering, both the freewheeling transistor and the freewheeling diode are thus present parallel to the electric motor.

A circuit of this kind has the advantage that the power loss is appreciably lower as compared with the exclusively passive freewheeling device. At high control application frequencies a device of this kind can moreover be operated with no problems, especially if the freewheeling time period is sufficiently short that the entire motor current is not dissipated via the freewheeling device. Negative effects can occur, however, at low frequencies, at which in some circumstances "discontinuous" operation occurs (i.e. the motor current decreases to zero in the freewheeling time period). If the freewheeling transistor is switched, i.e. made conductive, over the entire freewheeling time period, the result of the generator-mode motor voltage of the electric motor, due to the short circuit via the freewheeling transistor, is that the motor current direction rotates and the electric motor is braked. This appreciably increases the power loss, since a large amount of energy is consumed for constant acceleration and deceleration of the electric motor.

Provision can therefore be made, for this reason, to shut off the freewheeling transistor, i.e. interrupt the freewheeling path through it, in timely fashion. The point in time of this shutoff is difficult to identify, however, and usually depends on numerous parameters, for example the motor rotation speed, voltage of the current source, inductance of the electric motor, winding resistance, filter properties of a vehicle electrical system, and the like. A direct measurement of the motor current is possible but is relatively complex and cost-intensive to implement, for example because current shunts and/or fast, interference-resistant amplifiers or comparators are required.

In order to implement control application to the freewheeling transistor in a simple manner and in particular with little circuit outlay, and moreover economically, provision is therefore made that the freewheeling transistor is switched for the specific switching time period only if the freewheeling voltage dropping across via the electric motor is different from zero. The sequence selected in this context is in principle arbitrary. Provision can thus be made firstly to identify, in a measurement time period, the freewheeling voltage dropping across the electric motor and then to switch the freewheeling transistor as a function of the identified freewheeling voltage. A comparison of the identified freewheeling voltage with the value zero is thus performed, and control is applied to the freewheeling transistor in accordance with the result of that comparison. In a variant of or supplement to the method, provision is made to switch the freewheeling transistor for the specific switching time period immediately at the beginning of the freewheeling time period, and only then to perform the above-described method in the sequence indicated, namely identifying the freewheeling voltage and then correspondingly switching the freewheeling transistor. The identification of the freewheeling voltage may be accomplished particularly by measurement. A corresponding measurement device can be provided for this purpose.

If the specific switching time period, during which switching of the freewheeling transistor occurs, ends before the end of the working cycle, the procedure described is then repeated, i.e. the freewheeling voltage is again identified and the freewheeling transistor is switched as a function of it. If the working cycle ends before the end of the switching time period, however, then the switching time period is also terminated and the next working cycle, and thus the next activation time period, are initiated immediately.

In summary, during the freewheeling time period the measurement time period and the specific switching time period are therefore carried out alternatingly until the freewheeling time period of the working cycle has ended. It is significant in this regard that the switching of the freewheeling transistor is not carried out continuously, but instead is subdivided into smaller segments, namely the specific switching time periods. After each switching time period the freewheeling voltage is identified and compared with zero. As long as the motor current has not been dissipated, the freewheeling voltage is approximately −0.7 V, since current is flowing in the forward direction through the freewheeling diode connected in parallel with the freewheeling transistor.

Particularly, the freewheeling transistor may be switched during the specific switching time period only if the freewheeling voltage is less than zero. If the motor current has already been dissipated, the freewheeling voltage is not negative, i.e. not less than zero. With a stationary electric motor the freewheeling voltage is equal to zero; when the electric motor is running (and the motor current has already been dissipated) it is positive. In the latter case provision is made in particular that the identification of the freewheeling voltage and the switching of the freewheeling transistor are halted for the remainder of the freewheeling time period, i.e. the end of the freewheeling time period is allowed to arrive with no (possibly re-)switching of the freewheeling transistor.

The method according to the present invention has numerous advantages. On the one hand an appreciably lower power loss in the freewheeling path or the freewheeling device is achieved, especially as compared with methods that use a passive freewheeling device. For example, the power loss can be reduced by approximately 70% to 90%. The thermal load on the components used, in particular on the freewheeling device, is correspondingly reduced. Furthermore there is no need to calculate the switching time period, for example using a software program. An implementation of the method exclusively in hardware is instead possible. The need for an accurate and fast measurement of the motor current is also eliminated; it is sufficient to identify the freewheeling voltage. The freewheeling voltage, or generator voltage, can be identified immediately after the activation time period and/or immediately after the switching time period.

An exemplary embodiment of the invention provides that the duration of the switching time period is specified to be constant. It is thus not necessary to vary the duration or length of the switching time period in order thereby to switch off the freewheeling transistor when the motor current has decreased to zero. Instead, the freewheeling transistor is always switched for the entire, constant switching time period if the condition for the freewheeling voltage is met. This can easily be implemented in hardware; in other words, there is no need for a software program or the like in order to carry out the method.

A refinement of the invention provides that the duration of the switching time period is selected to be equal to a duration of less than 50%, in particular at most 40%, at most %, at most 25%, at most 20%, at most 15%, at most 10%, at most 5%, or at most 1% of the duration of the working cycle.

In order to avoid the problem described initially, namely that the motor current decreases to zero while the freewheeling transistor is switched, the switching time period is to be selected in such a way that in all cases the freewheeling voltage is identified, and the freewheeling transistor correspondingly switched, repeatedly during the working cycle. For this reason, the switching time period may be shorter than half the working cycle. Particularly, however, a higher clock frequency may be selected in order to reduce the power loss as much as possible. The duration of the switching time period corresponds, for example, to the values recited above, but can also be appreciably shorter and can correspond to at most 0.5%, at most 0.25%, or at most 0.1% of the duration of the working cycle.

An exemplary embodiment of the invention provides that the identification of the freewheeling voltage occurs in a measurement time period during which the freewheeling transistor is not switched. As already indicated above, the measurement time period and the specific switching time period alternate in the freewheeling time period until the freewheeling time period or the corresponding working cycle has ended. It can of course also happen in this context that the measurement time period and/or the switching time period is terminated before its actual end, i.e. when the working cycle ends. The freewheeling transistor is not switched during the measurement time period, so that the freewheeling voltage can easily be identified. The freewheeling voltage can of course also be merely approximately identified, i.e. in particular estimated.

Provision may thus particularly be made that the measurement time period is selected to be shorter than the switching time period. For example, the duration of the measurement time period is at most 50%, at most 25%, at most 10%, at most 5%, or at most 1% of the duration of the switching time period.

A refinement of the invention provides that a MOSFET is used as a freewheeling device, and that the freewheeling diode is present as a body diode of the MOSFET. The term "MOSFET" is understood to mean a "metal oxide semiconductor field effect transistor." This contains, besides the field effect transistor serving as a freewheeling transistor, a body diode that is connected in parallel with the field effect transistor. Both the freewheeling transistor and the freewheeling diode can correspondingly be implemented with one integrated component of this kind.

A further advantageous embodiment of the invention provides that application of control to the switching device, application of control to the freewheeling device, and/or identification of the freewheeling voltage are accomplished by way of a control unit, in particular by way of an integrated circuit of the control unit. The electric motor thus has associated with it the control unit, which particularly may have the integrated circuit. The steps necessary for carrying out the method are then implemented with the aid of the control unit. In particular, only the integrated circuit of the control unit is utilized in this context. This means that no software program or the like is necessary. Instead, all that is necessary is the integrated circuit, which is present e.g. as an application-specific integrated circuit (ASIC).

Provision can furthermore be made that a power transistor is used as a switching device. Often only a voltage in the low-voltage range is utilized to operate the electric motor. The current intensity of the electrical current flowing through the electric motor and consequently through the switching device is correspondingly very high, at least at times. For this reason, a power transistor that is notable, for example, for a maximum collector current of more than 1 A is used as a switching device.

Lastly, provision can be made that in the at least one operating mode, the motor current flowing through the electric motor is completely dissipated during the freewheeling time period. This is usually the case only if the switching time period has only a short duration, i.e. the effective operating voltage is appreciably lower than the voltage furnished by the current source. As already indicated above, it is particularly useful to carry out the method according to the present invention in this case in order to reduce power loss. If the motor current is reduced using a continuously switched freewheeling transistor, the electric motor then becomes braked after the motor current is dissipated, so that the power loss is correspondingly high. This is not the case with the method described above, in which the freewheeling transistor is switched for the specific time period only if the freewheeling voltage is different from zero.

The invention furthermore relates to an electric motor device, in particular for carrying out the method described above, having an electric motor that is connectable via a switching device to a current source and is connected in parallel with a freewheeling device, a control unit being embodied to apply control to the switching device at a specific activation ratio within each working cycle in order to establish a desired effective operating voltage of the electric motor, so that each working cycle is made up, in at least one operating mode, of an activation time period and a freewheeling time period. Provision is made here that the freewheeling device has a freewheeling transistor and, connected in parallel therewith and reverse-biased with respect to the current source, a freewheeling diode; and that the control unit is embodied to apply control to the freewheeling transistor in the freewheeling time period with the following steps: identifying the freewheeling voltage dropping across the electric motor; and switching the freewheeling transistor for a switching time period if the freewheeling voltage is different from zero, in particular is less than zero. The disadvantages of an electric motor device of this kind, and of the corresponding method, have already been discussed. The electric motor device and the method can of course be refined in accordance with the statements made above, to which the reader is therefore referred.

The invention will be explained in further detail below with reference to the exemplifying embodiments depicted in the drawings, but without limiting the invention.

DETAILED DESCRIPTION

Figure 1:
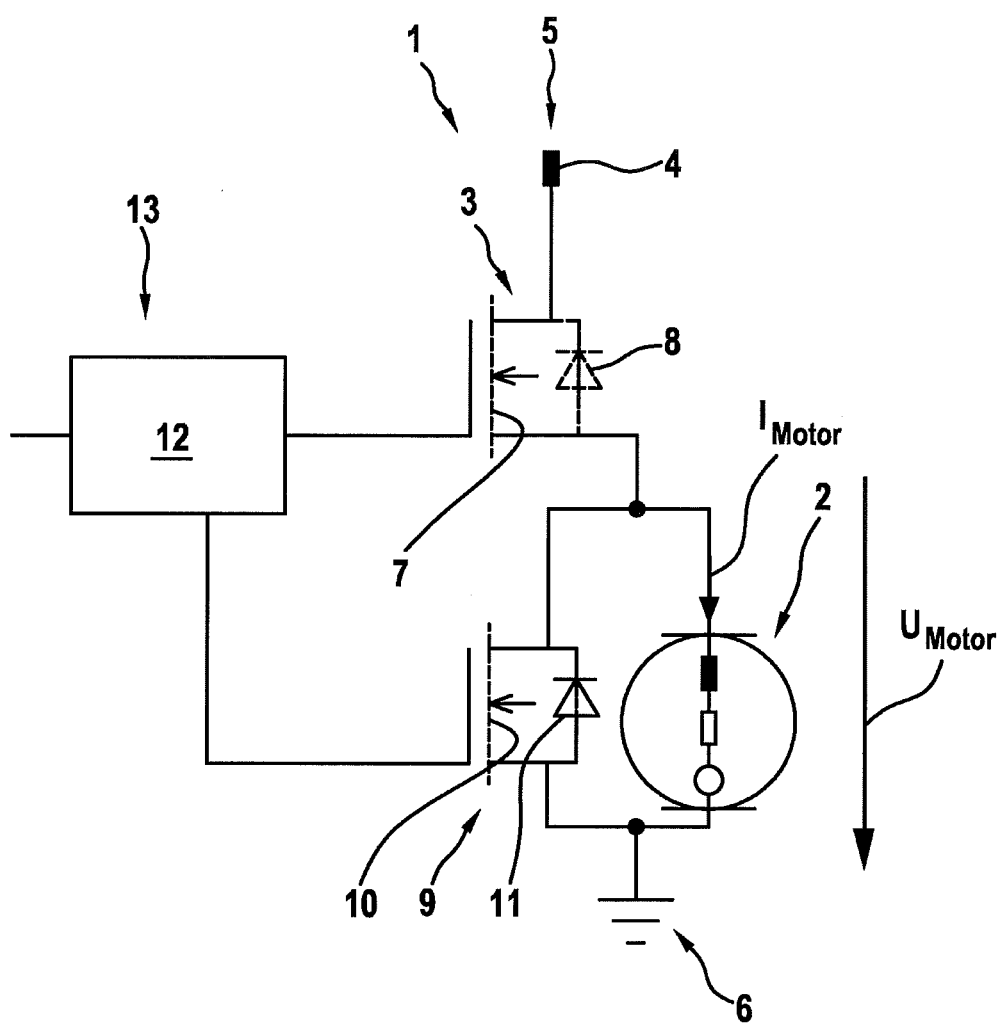
FIG. 1 schematically depicts an electric motor device.

FIG. 1 schematically depicts an electric motor device 1. The latter has an electric motor 2 and a switching device 3 that is connected in series with electric motor 2. Electric motor 2 is connectable via switching device 3 to one pole 4 of a current source 5. Conversely, electric motor 2 is connected directly to a pole 6. Electric motor 2 can consequently, by corresponding switching of switching device 3 which may have a power transistor 7, be connected to or disconnected from current source 5 or its pole 4. Switching device 3 can also have, besides power transistor 7, a diode 8 that in this case is disposed in parallel with power transistor 7 and is reverse-biased with respect to current source 5.

A freewheeling device 9, which has a freewheeling transistor 10 and a freewheeling diode 11 connected in parallel therewith, is electrically connected in parallel with electric motor 2. Particularly, freewheeling device 9 may be present in the form of a MOSFET. The latter possesses a body diode which is employed as a freewheeling diode 11. Control is applied to freewheeling device 9 or to freewheeling transistor 11 by way of an integrated circuit 12 that is, for example, a constituent of a control unit 13. Switching device 3 can also have control applied to it with the aid of control unit 13 and in particular by way of circuit 12.

While electric motor device 1 is in operation, control is applied to switching device 3 in such a way that an effective operating voltage is established at electric motor 2, i.e. in particular is periodically switched and switched off. This effective operating voltage can deviate from a voltage $U_S$ supplied from current source 5, in particular can be less than it. Provision is made, for this purpose, for clocked operation of switching device 3 within immediately successive working cycles. For each working cycle, a specific activation ratio is selected and is established at switching device 3. This activation ratio describes the ratio between an activation time period in which switching device 3 is switched (made conductive) and the duration of the respective working cycle. At a ratio of unity, switching device 3 is thus switched during the entire working cycle. Provision is made in at least one operating mode of electric motor device 1, however, that the ratio is less than unity, so that besides the activation time period a freewheeling time period exists in the working cycle. The voltage present at electric motor 2 is referred to as $U_{Motor}$. This corresponds, during the activation time period, substantially to the voltage $U_S$ of current source 5.

Because electric motor 2 or its motor windings, which are not separately characterized here, have a high inductance, it is necessary—after the electrical connection between electric motor 2 and current source 5 has been interrupted by way of switching device 3—to dissipate the electrical current $I_{Motor}$ flowing through electric motor 2. Freewheeling device 9 is provided for this purpose. The motor current is dissipated by switching freewheeling transistor 10 while switching device 3 is simultaneously open.

In order to prevent the current direction of the current flowing through electric motor 2 from rotating and thereby braking the latter, freewheeling transistor 10 is to have control applied to it during the freewheeling time period as follows: Provision is made that a measurement time period and a specific switching time period, the duration of which latter is specified as a constant, alternate during the freewheeling time period. During the measurement time period, the freewheeling voltage that is dropping across the electric motor is identified. If the voltage is different from zero, in particular less than zero, the switching time period is then initiated; in this, freewheeling transistor 10 is switched so that the two poles of electric motor 2 are electrically connected to one another. During the measurement time period, conversely, or in principle outside the switching time period, freewheeling transistor 10 is not switched, i.e. is not conductive. The identification of the freewheeling voltage can, for example, likewise be performed with the aid of circuit 12 or control unit 13.

In addition to the procedure described above, provision can also be made that before identification of the freewheeling voltage firstly the specific switching time period, during which freewheeling transistor 9 is switched, is initiated. This switching time period is then followed by the procedure described, in which, alternately during the measurement time period, the freewheeling voltage is identified and then freewheeling transistor 10 is switched for the specific switching time period as a function of the identified freewheeling voltage. In at least one operating mode of electric motor device 1, provision is made to dissipate the motor current flowing through electric motor 2 completely during the freewheeling time period.

Figure 2:
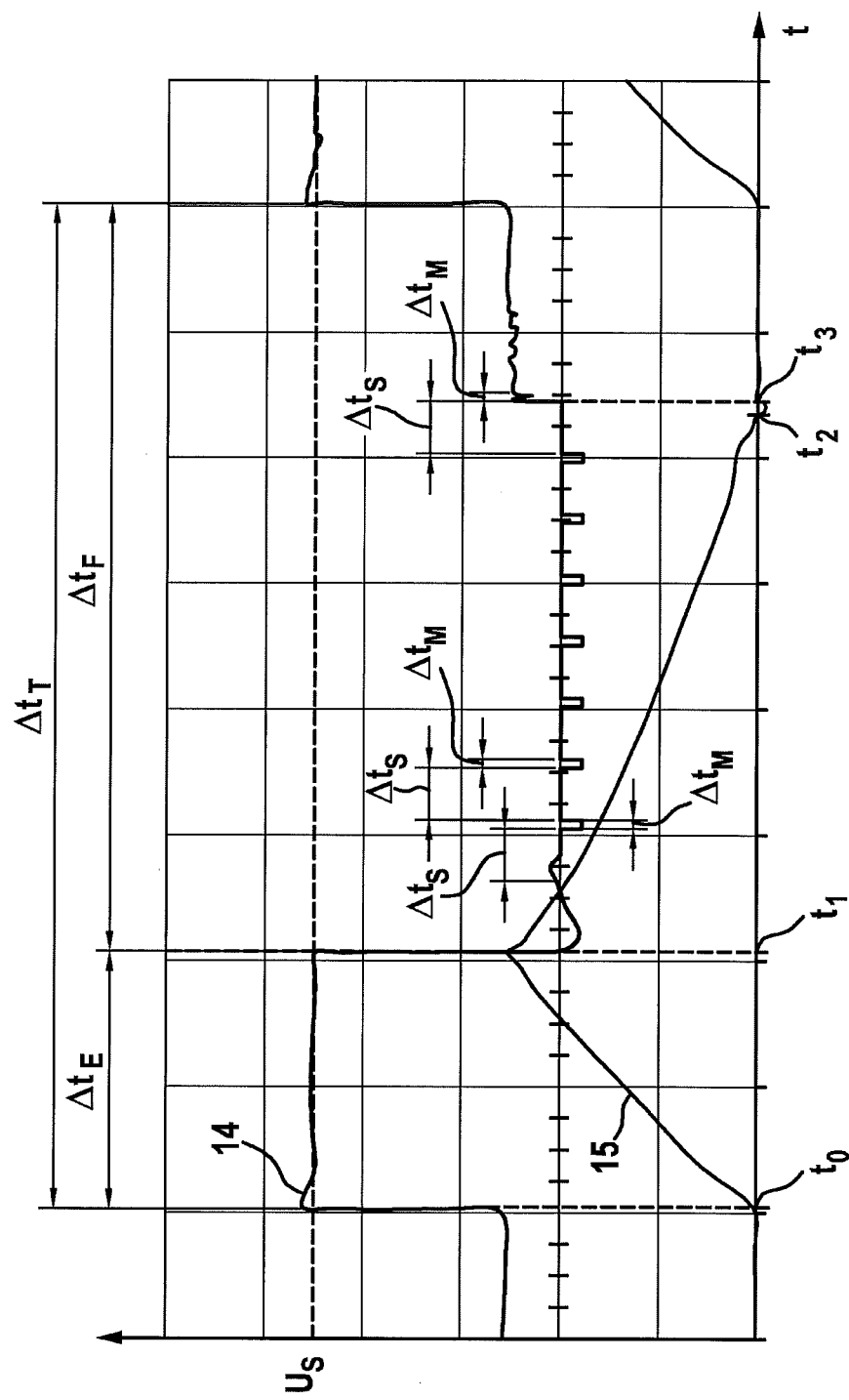
FIG. 2 is a diagram in which a motor voltage and a motor current are plotted over time.

The time course of the method described above is illustrated with reference to FIG. 2. This is a diagram in which a curve 14 shows the change in the motor voltage $U_{Motor}$ over time, and a curve 15 shows the change in the motor current $I_{Motor}$ over time. The duration of the working cycle is labeled $\Delta t_T$, the duration of the activation time period $\Delta t_E$, and the duration of the freewheeling time period $\Delta t_F$, where $\Delta t_T = \Delta t_E + \Delta t_F$. At the beginning of the working cycle, i.e. at time $t_0$, the motor current $I_{Motor}$ is, for example, equal to zero. Starting at time $t_0$, electric motor 2 is connected to current source 5 by way of switching device 3. The motor voltage $U_{Motor}$ is correspondingly equal to the voltage $U_S$ of current source 5, and the motor current $I_{Motor}$ rises. At the end of the activation time period, at time $t_1$, the electrical connection is interrupted. In order then to dissipate the motor current $I_{Motor}$, in the freewheeling time period freewheeling transistor 10 is made conductive at least once for a switching time period. In the diagram depicted, several such switching time periods are provided. They are labeled $\Delta t_S$, but only in part. The first switching time period can be provided with a time delay after the end of the activation time period. It can also, however, of course immediately follow the activation time period.

As depicted, switching time periods and measurement time periods (labeled only in part as $\Delta t_M$) alternate in the freewheeling time period. A reverse sequence, in which firstly a measurement time period is initiated and a switching time period is initiated only later at a corresponding motor voltage $U_{Motor}$, is also possible. The alternation may be provided for at least until a time $t_2$ at which the motor current $I_{Motor}$ has been dissipated to zero. In principle, however, the fact that the motor current $I_{Motor}$ has been dissipated in one of the switching time periods can only be ascertained in the measurement time period following it. This measurement time period begins at time $t_3$. Ideally, (but, as depicted, not necessarily), the times $t_2$ and $t_3$ coincide. Because the motor current $I_{Motor}$ is equal to zero starting at time $t_2$, the motor voltage $U_{Motor}$ that is ascertained in the measurement time period is positive if electric motor 2 is still running, and equal to zero if that is not the case. With a positive motor voltage $U_{Motor}$ and/or a motor voltage $U_{Motor}$ equal to zero, a further switching time period is not initiated after the measurement time period until the freewheeling time period or the working cycle has ended.

What is claimed is:

1. A method for operating an electric motor, which is connectable via a switching device to a current source and which is connected in parallel with a freewheeling device, the method comprising:

applying control to the switching device at a specific activation ratio within each working cycle to establish a desired effective operating voltage of the electric motor, so that in at least one operating mode each working cycle is made up of an activation time period and a freewheeling time period, wherein the applying control to the switching device includes switching the switching device to a conductive state during the activation period in order to supply current to the motor via the switching device, wherein the freewheeling device includes a freewheeling transistor and a freewheeling diode connected in parallel with the freewheeling transistor, wherein the freewheeling diode is reverse-biased with respect to the current source;

at a conclusion of the activation time period, interrupting a connection between the motor and the current source by switching the switching device into a nonconductive state; and while the connection between the motor and the current source is interrupted during the freewheeling time period, applying control to the freewheeling transistor in the freewheeling time period by identifying a freewheeling voltage dropping across the electric motor when the freewheeling transistor is in a nonconductive state, and by switching the freewheeling transistor into a conductive state for a specific switching time period if the freewheeling voltage is less than zero.

2. The method of claim 1, wherein the duration of the switching time period is defined as a constant.

3. The method of claim 1, wherein the duration of the switching time period is selected to be equal to a duration of less than 50% of the duration of the working cycle.

4. The method of claim 1, wherein the identification of the freewheeling voltage is accomplished in a measurement time period during which the freewheeling transistor is not switched.

5. The method of claim 1, wherein the measurement time period is selected to be shorter than the switching time period.

6. The method of claim 1, wherein a MOSFET is used as a freewheeling device, and the freewheeling diode is a body diode of the MOSFET.

7. The method of claim 1, wherein at least one of application of control to the switching device, application of control to the freewheeling device, and identification of the freewheeling voltage are accomplished by a control unit or by an integrated circuit of the control unit.

8. The method of claim 1, wherein the switching device includes a power transistor.

9. The method of claim 1, wherein in the at least one operating mode, the motor current flowing through the electric motor is completely dissipated during the freewheeling time period.

10. The method of claim 1, wherein the duration of the switching time period is selected to be equal to a duration of at most 40%, of the duration of the working cycle.

11. The method of claim 1, wherein the duration of the switching time period is selected to be equal to a duration of at most 30%, of the duration of the working cycle.

12. The method of claim 1, wherein the duration of the switching time period is selected to be equal to a duration of at most 25%, of the duration of the working cycle.

13. The method of claim 1, wherein the duration of the switching time period is selected to be equal to a duration of at most 20%, of the duration of the working cycle.

14. The method of claim 1, wherein the duration of the switching time period is selected to be equal to a duration of at most 15%, of the duration of the working cycle.

15. The method of claim 1, wherein the duration of the switching time period is selected to be equal to a duration of at most 10%, of the duration of the working cycle.

16. The method of claim 1, wherein the duration of the switching time period is selected to be equal to a duration of at most 5%, of the duration of the working cycle.

17. The method of claim 1, wherein the duration of the switching time period is selected to be equal to a duration of at most 1%, of the duration of the working cycle.

18. The method of claim 1, wherein the freewheeling voltage is different from zero and in particular is less than zero.

19. The method of claim 1, further comprising:
if the switching time period ends before an end of the working cycle:
determining the freewheeling voltage anew, and
switching the freewheeling transistor if the freewheeling voltage differs from zero.

20. An electric motor device, comprising:
an electric motor, which is connectable via a switching device to a current source and which is connected in parallel with a freewheeling device;
a control unit to apply control to the switching device at a specific activation ratio within each working cycle to establish a desired effective operating voltage of the electric motor, so that each working cycle is made up, in at least one operating mode, of an activation time period and a freewheeling time period, wherein the applying control to the switching device includes switching the switching device to a conductive state during the activation period in order to supply current to the motor via the switching device, wherein the freewheeling device has a freewheeling transistor and, connected in parallel therewith and reverse-biased with respect to the current source, a freewheeling diode;
wherein, while a connection between the motor and the current source is interrupted by switching the switching device into a nonconductive state during the freewheeling time period, the control unit is configured to apply control to the freewheeling transistor in the freewheeling time period by identifying a freewheeling voltage dropping across the electric motor when the freewheeling transistor is in a nonconductive state, and by switching the freewheeling transistor for a switching time period if the freewheeling voltage is less than from zero.

21. The electric motor device of claim 20, wherein:
if the switching time period ends before an end of the working cycle:
the freewheeling voltage anew is determined, and
the freewheeling transistor is switched if the freewheeling voltage differs from zero.

* * * * *